(12) United States Patent
Luciano, Jr. et al.

(10) Patent No.: US 10,055,941 B2
(45) Date of Patent: *Aug. 21, 2018

(54) HIGH INTEGRITY GOLF WAGERING SYSTEM

(71) Applicant: Edge Technology, LLC, Reno, NV (US)

(72) Inventors: Robert A. Luciano, Jr., Reno, NV (US); Warren R. White, Reno, NV (US)

(73) Assignee: EDGE TECHNOLOGY, LLC., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,511

(22) Filed: Jun. 2, 2016

(65) Prior Publication Data

US 2016/0358425 A1 Dec. 8, 2016

Related U.S. Application Data

(63) Continuation of application No. 13/804,899, filed on Mar. 14, 2013, now Pat. No. 9,339,715, which is a continuation of application No. 13/655,882, filed on Oct. 19, 2012, now Pat. No. 9,498,680, which is a continuation of application No. 13/277,940, filed on
(Continued)

(51) Int. Cl.
*A63F 13/00* (2014.01)
*G07F 17/32* (2006.01)
*A63B 63/00* (2006.01)
*G06Q 10/06* (2012.01)

*G06K 9/00* (2006.01)
*G06T 7/00* (2017.01)
*G07F 17/38* (2006.01)
*H04W 4/80* (2018.01)

(52) U.S. Cl.
CPC .......... *G07F 17/3288* (2013.01); *A63B 63/00* (2013.01); *G06K 9/00342* (2013.01); *G06K 9/00771* (2013.01); *G06Q 10/0639* (2013.01); *G06T 7/00* (2013.01); *G07F 17/326* (2013.01); *G07F 17/3279* (2013.01); *G07F 17/3295* (2013.01); *G07F 17/38* (2013.01); *H04W 4/80* (2018.02); *G06T 2207/30221* (2013.01)

(58) Field of Classification Search
None
See application file for complete search history.

(56) References Cited

U.S. PATENT DOCUMENTS 3,782,730 A 1/1974 Horchler
4,516,770 A 5/1985 Brookes et al.
(Continued)

*Primary Examiner* — Jason Yen
(74) *Attorney, Agent, or Firm* — Kerr IP Group, LLC

(57) ABSTRACT

A system and method for providing a high integrity golf wagering game. The system includes a driving range with hitting bays where players hit balls at targets. Individual balls are associated with a particular player and are tracked from the tee in a hitting bay to a target. If a player hits a ball into a target, a wagering game is offered that awards prizes to a player depending on the outcome of the game. The game itself may take many different forms including a slot type game. The system and method include variants for randomization of game results or results based in whole or in part on a player's skill in hitting targets.

26 Claims, 14 Drawing Sheets

Related U.S. Application Data

Oct. 20, 2011, now Pat. No. 9,339,697, said application No. 13/804,899 is a continuation of application No. 13/444,652, filed on Apr. 11, 2012, now Pat. No. 9,370,694, which is a continuation of application No. 13/277,940, filed on Oct. 20, 2011, now Pat. No. 9,339,697, said application No. 13/804,899 is a continuation of application No. 13/444,679, filed on Apr. 11, 2012, now Pat. No. 9,539,471, which is a continuation of application No. 13/277,940, filed on Oct. 20, 2011, now Pat. No. 9,339,697, said application No. 13/804,899 is a continuation of application No. 13/444,660, filed on Apr. 11, 2012, now Pat. No. 9,643,056, which is a continuation-in-part of application No. 13/277,940, filed on Oct. 20, 2011, now Pat. No. 9,339,697, said application No. 13/804,899 is a continuation of application No. 13/655,853, filed on Oct. 19, 2012, now Pat. No. 9,498,682, which is a continuation of application No. 13/277,940, filed on Oct. 20, 2011, now Pat. No. 9,339,697, which is a continuation of application No. 13/212,850, filed on Aug. 18, 2011, now Pat. No. 8,866,613, and a continuation of application No. 13/212,885, filed on Aug. 18, 2011, now Pat. No. 9,035,749.

(60) Provisional application No. 62/170,681, filed on Jun. 3, 2015, provisional application No. 61/176,646, filed on Feb. 19, 2013, provisional application No. 61/375,555, filed on Aug. 20, 2010, provisional application No. 61/374,713, filed on Aug. 18, 2010, provisional application No. 61/375,555, filed on Aug. 20, 2010.

(56) References Cited

U.S. PATENT DOCUMENTS

| | | | |
|---|---|---|---|
| 5,102,140 A * | 4/1992 | Vincent | A63B 24/0003 473/156 |
| 5,370,389 A | 12/1994 | Reising | |
| 5,513,841 A | 5/1996 | Takagi | |
| 5,626,561 A | 5/1997 | Butler et al. | |
| 5,743,815 A | 4/1998 | Helderman | |
| 6,569,028 B1 | 5/2003 | Nichols et al. | |
| 6,607,456 B2 | 8/2003 | Jollifee et al. | |
| 6,974,391 B2 | 12/2005 | Ainsworth et al. | |
| 6,998,965 B1 * | 2/2006 | Luciano, Jr. | A63B 24/0021 235/375 |
| 7,052,391 B1 * | 5/2006 | Luciano, Jr. | A63B 24/0021 463/28 |
| 7,056,221 B2 | 6/2006 | Thurkettle et al. | |
| 7,059,974 B1 | 6/2006 | Golliffe et al. | |
| 7,160,196 B2 | 1/2007 | Thirkettle et al. | |
| 7,337,965 B2 | 3/2008 | Thurkettle et al. | |
| 2003/0125122 A1 | 7/2003 | Jolliffe et al. | |
| 2004/0048686 A1 | 3/2004 | Thirkettle et al. | |
| 2004/0063510 A1 | 4/2004 | Thirkettle et al. | |
| 2004/0176174 A1 | 9/2004 | Thirkettle et al. | |
| 2005/0051951 A1 * | 3/2005 | Benevento | A63B 67/02 273/120 R |
| 2005/0272496 A1 * | 12/2005 | Reinish | A63B 63/00 463/2 |
| 2008/0021651 A1 * | 1/2008 | Seeley | A63B 24/0021 702/3 |

* cited by examiner

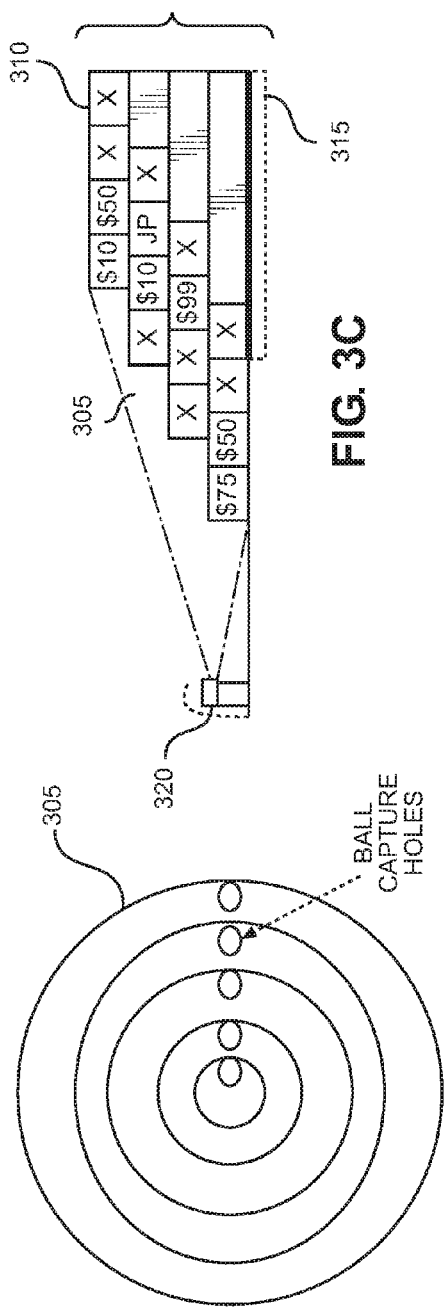
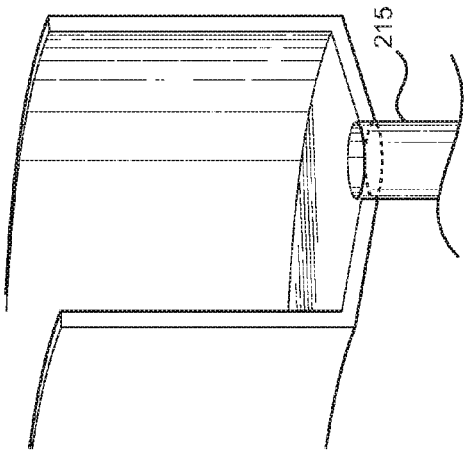
FIG. 3C
FIG. 3D
FIG. 3A
FIG. 3B

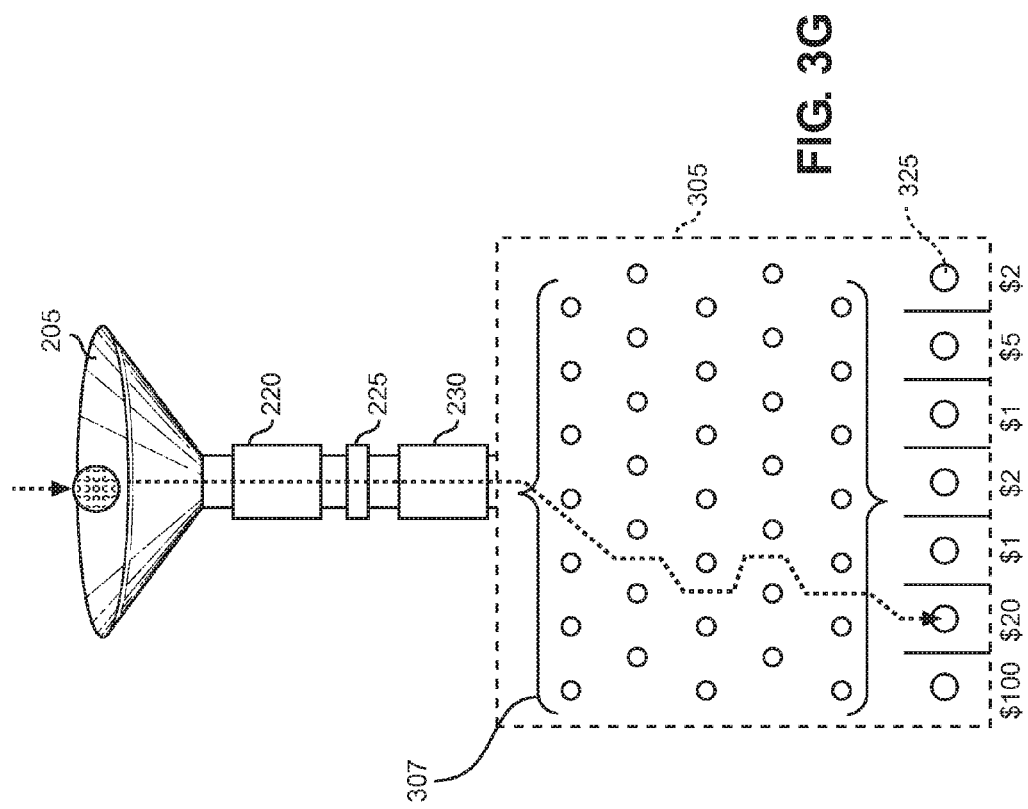

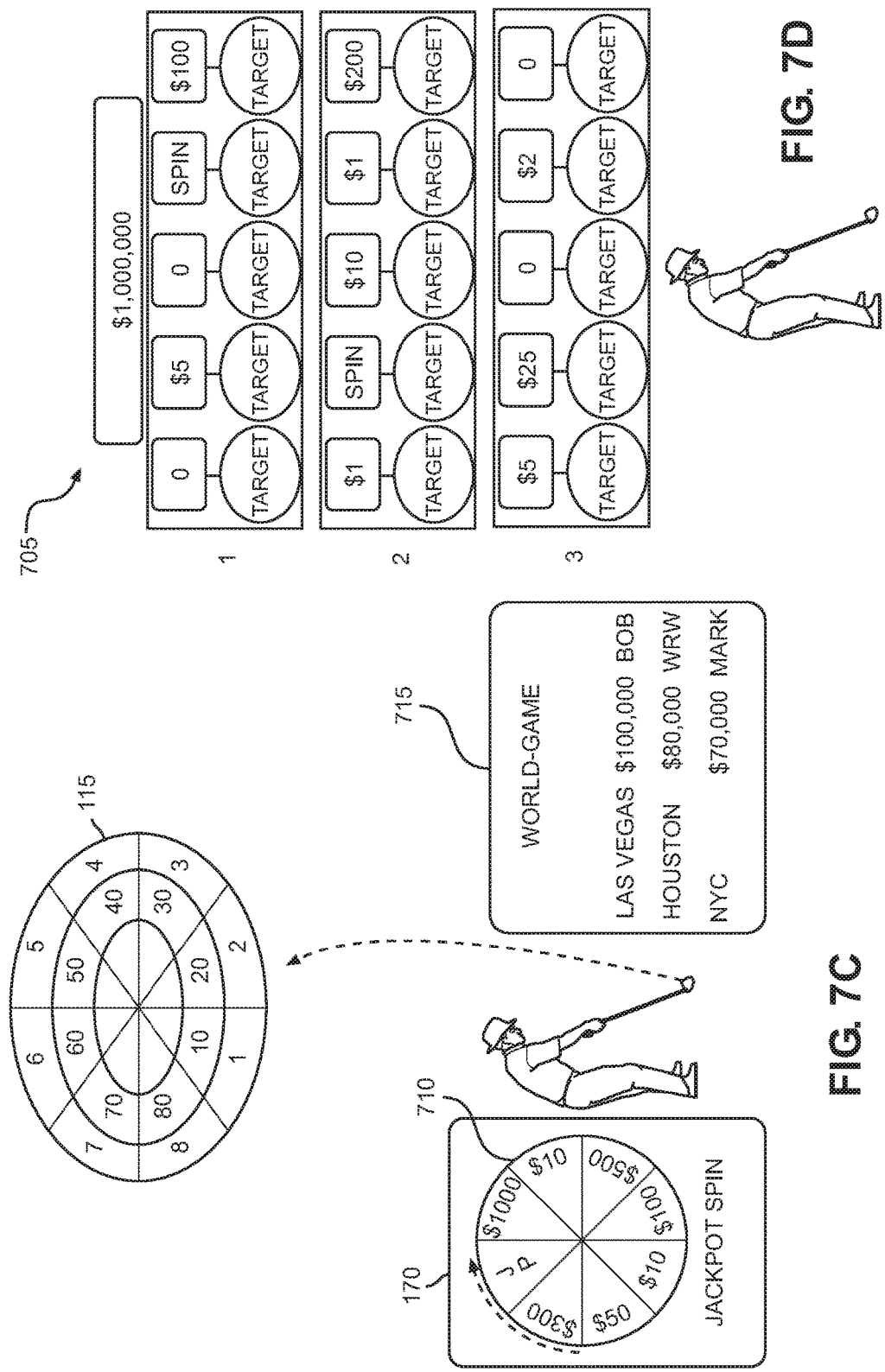

FIG. 9

DO YOU WANT TO PARTICIPATE IN WAGER GAMES?

YES  NO

WHAT SIZE WAGERS DO YOU WANT TO ALLOW?

$1   $5   $10   $100
$.01 $.02 $.05  $.10
$.25 $.50 $.75  MORE

HIGH INTEGRITY GOLF WAGERING SYSTEM

RELATED APPLICATION INFORMATION

This application claims priority benefit from U.S. Provisional Application No. 62/170,681, filed on Jun. 3, 2015 entitled HIGH INTEGRITY GOLF WAGERING SYSTEM; and is a continuation-in-part of utility patent application Ser. No. 13/655,853 now U.S. Pat. No. 9,498,682 filed on Oct. 19, 2012 entitled RFID EMBEDDED WITHIN INNER CORE OF A MULTI-CORE GOLF BALL; and is a continuation-in-part of utility patent application Ser. No. 13/655,882 now U.S. Pat. No. 9,498,680 filed on Oct. 19, 2012 entitled SPLIT CORE OF A MULTI-CORE GOLF BALL WITH RFID; and is a continuation-in-part of utility patent application Ser. No. 13/444,679 now U.S. Pat. No. 9,539,471 filed on Apr. 11, 2012 entitled GOLF BALL WITH ENCAPSULATED RFID CHIP; and is a continuation-in-part of utility patent application Ser. No. 13/444,660 now U.S. Pat. No. 9,643,056 filed on Apr. 11, 2012 entitled GOLF BALL WITH RFID INLAY BETWEEN A SPLIT CORE; and is a continuation-in-part of utility patent application Ser. No. 13/444,652 now U.S. Pat. No. 9,370,694 filed on Apr. 11, 2012 entitled GOLF BALL WITH RFID INLAY IN A MOLDED IMPRESSION; and is a continuation-in-part of utility patent application Ser. No. 13/804,899 now U.S. Pat. No. 9,339,715 filed on Mar. 14, 2013 entitled RADAR BASED TRACKING SYSTEM FOR GOLF DRIVING RANGE which claims the benefit of provisional patent application 61/766,646 filed on Feb. 19, 2013 entitled RADAR BASED RACKING SYSTEM FOR GOLF DRIVING RANGE; and is a continuation-in-part of utility patent application Ser. No. 13/277,940 now U.S. Pat. No. 9,339,697 filed on Oct. 20, 2011 entitled RFID GOLF BALL TARGET SYSTEM AND METHOD; and is a continuation-in-part of utility patent application Ser. No. 13/212,850 now U.S. Pat. No. 8,866,613 filed on Aug. 18, 2011 entitled BALL SEPARATION DEVICE FOR A GOLF RANGE TARGET, which claims the benefit of provisional patent application 61/375,555 filed on Aug. 20, 2010 entitled BALL SEPARATION DEVICE FOR A GOLF RANGE TARGET. All patent applications identified above are hereby incorporated by reference in the present application.

BACKGROUND

Golf has been a popular form of entertainment for many years, crossing many cultures. In recent years there has been interest in applying new technology to creating new entertainment variants of the game. Driving ranges have become popular with as many as 100 (or more) "hitting bays" on multiple levels.

More recently a new variant of golf play has emerged which allows players at driving ranges to play entertainment games, hitting golf balls toward targets which are associated with scores.

One way of doing this is to produce golf balls with imbedded Radio Frequency Identification Devices (RFIDs) in all of the golf balls used in the facility. These chips have encoded values that can be detected by a generated radio frequency and antenna. The RFID in the ball is associated with a player or a particular hitting bay before it is hit by the player. When the player uses an RFID ball that is hit into a target area, that particular ball RFID is detected at a target equipped with RFID detection devices, it enables electronic scoring of hits on particular targets or target areas and determination of which player hit which target area. This information can then be automatically detected by computer systems and used to score games that the player participates in. Other technologies that may be used in combination with, or instead of, RFID identification have also been suggested. These include the use of Doppler-radar, or lasers.

Some of the aforementioned techniques are in use in commercial entertainment centers in the US and overseas.

There has been ongoing interest in creating a wagering system based on entertainment golf techniques, as described above, but with the added attraction of allowing wagers and financial and/or merchandise prizes. But, a wagering system must have much higher levels of accuracy and integrity for tracking the balls at the targets and generally in the system than are required for an entertainment-only system. In a non-wagering system there is a low standard of precise ball identification required and a relatively high tolerance for error. If a small percentage of balls fail to be identified properly by RFID, or other tracking mechanism, and do not register properly on a hit to a target area, it may be tolerated (up to some reasonable threshold). However, in a wagering system where the cost of a wager itself, as well as the potential to win monetary awards or other prizes of value are at stake, there is much less tolerance, either from players, game operators or from governmental regulators. As the stakes increase, the tolerance for inaccuracy lessens. Accuracy and reliability become quintessentially important. As a comparable example, consider the problems that would arise if someone were playing a slot machine and even 5% of the time when a dollar was spent to play there was no play and/or no chance to win due to an error or inaccuracy from the system. It would not be tolerated by players and operators, and governmental regulators would never approve such a system. Although there is some reasonable tolerance for very rare errors (all slot machines are typically marked, "Malfunction voids all plays and pays."), the error rate must be determined to be a miniscule fraction of a percent, and in that case it is required that players get refunds for any play cost in the event of a malfunction. Gaming regulators can be expected to require extremely high levels of accuracy including mechanisms to ensure that players are never "cheated" and that the game performs precisely as represented.

SUMMARY

The present invention provides apparatuses and methods to make golf wagering systems feasible in a regulated environment. New ways of playing a game are described as well as methods to improve the reliability of ball identification and proper identification of targets that those balls hit, in order to meet standards required by regulatory bodies.

BRIEF DESCRIPTION OF THE DRAWINGS

For a better understanding of the present invention, and to show more clearly how it is configured and functions, reference will now be made, by way of example, to the accompanying drawings. The drawings show embodiments of the present invention in which:

FIGS. 3A-3G are detailed views of a target for use in the high integrity golf wagering system of FIG. 1;

FIGS. 7A-D show different game embodiments that may be implemented on a high integrity golf wagering system;

FIG. 9 is a screen prompt for determining wager play participation level by a player.

DETAILED DESCRIPTION

Figure 1:
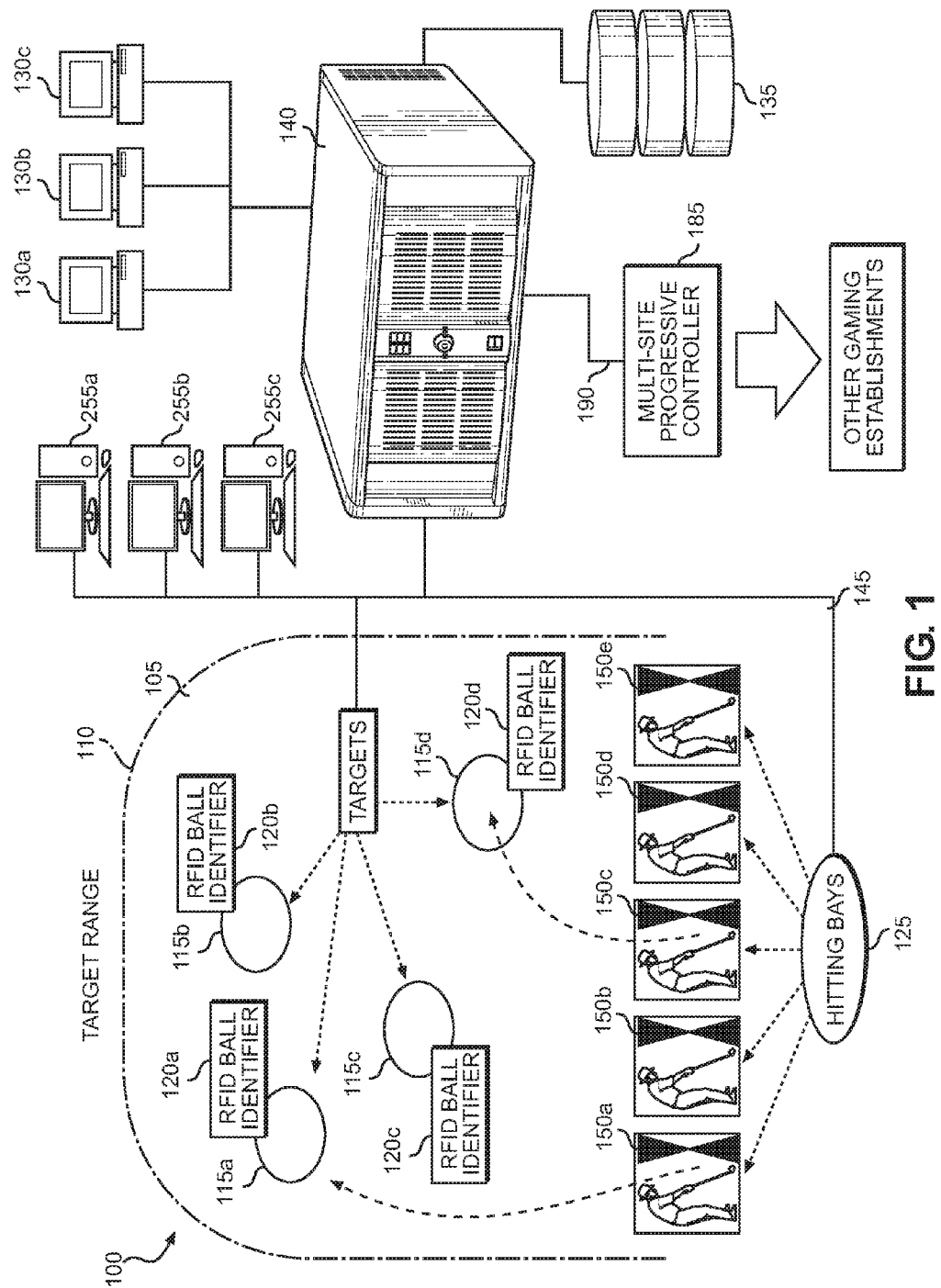
FIG. 1 shows a high integrity golf wagering system.

A golf wagering system 100 comprises a number of different components. An RFID (or other electronic ID) enabled golf balls that are hit from a hitting bay 125 onto a target range 105 that is enclosed. The enclosure is surrounded by netting 110, a wall or other suitable barriers to prevent errant ball hits from causing damage outside the property and to prevent balls from easily entering target range 105 from outside the property. The target range 105 includes one or more targets 115, each with an associated RFID ball identifier 120. Balls are hit by players from one or more hitting bays 125 that are typically situated at one end of target range 105. At the facility housing target range 105 are areas for payment of fees and collection of any prizes including one or more point of sale ("POS") stations 130. System 100 includes an accurate database system 135 for tracking ball hits and target activity. A high reliability and durable computer system 140 and network 145 access database 135 during different steps of the game cycle, including before and after play of a game. System 100 also includes ancillary support services (bars, restaurants, etc.). Communication between computer system 140 and database 135 enable the coordination of events and recording of information relating to the player, play selections, identification of golf balls, game play states, game play results and player accounting. Computer system 140 also communicates with other system components.

A local area network 145 for enabling communication between the components within a golf-gaming venue is shown. Communication on a wide area network 190 for use where there are multi-venue progressive games or access to common prizes is also shown. One or more Point-of-Sale ("POS") workstations 130 may be manned cashier stations or unmanned electronic kiosks for setting up player accounts, or other means for collection of play funds that can be used by the player and redemption of prizes by the player. Some of these functions may also be accomplished through the player interface 150 in a hitting bay. Management terminals 255 connected on local area network 145 to computer system 140 manage game configurations, control system operation, and provide financial and other data related golf system operations.

Using management terminals 255 at a Player Interface Unit 150 in the hitting bay, the player elects which game types or denomination games the player wishes to engage in. A mechanism within targets 115 allows a struck ball to be identified using RFID or other electronic ID with a particular player and stored in database 135.

Detectors in targets 115 identify a ball received in a target 115 and "link" it to either the player who struck the ball of the particular hitting bay 125 from which it was hit. System 100 also includes one or more game process randomizing steps that may be conducted using a device that is in a form including electronic or mechanical components, or a combination of both. The randomizing process determines a prize (including a zero non-winner) or play element that the player "wins". A display 170 for displaying the game results and associated entertaining animations to the player is included in system 100 form a component of one or more Player Interface Units ("PIU") 150 that are positioned in hitting bays 125. Each PIU 150 has a processor 168, display 170 and player input devices 175 (buttons, touch-screen, and other devices) and communicates with central computer 140 as well as other components of the system.

Management terminals 255 may be used by authorized personnel to add prize values won to the player's account that are stored on databases 135. Any player may also access their account to redeem values that were previously won or deposited. Targets 115 include one or more sensors 200 that are used in the mechanical randomization process to detect the actions of the mechanical randomizer and/or ball and report the result to computer system 150 and PIU 150.

Figure 2:
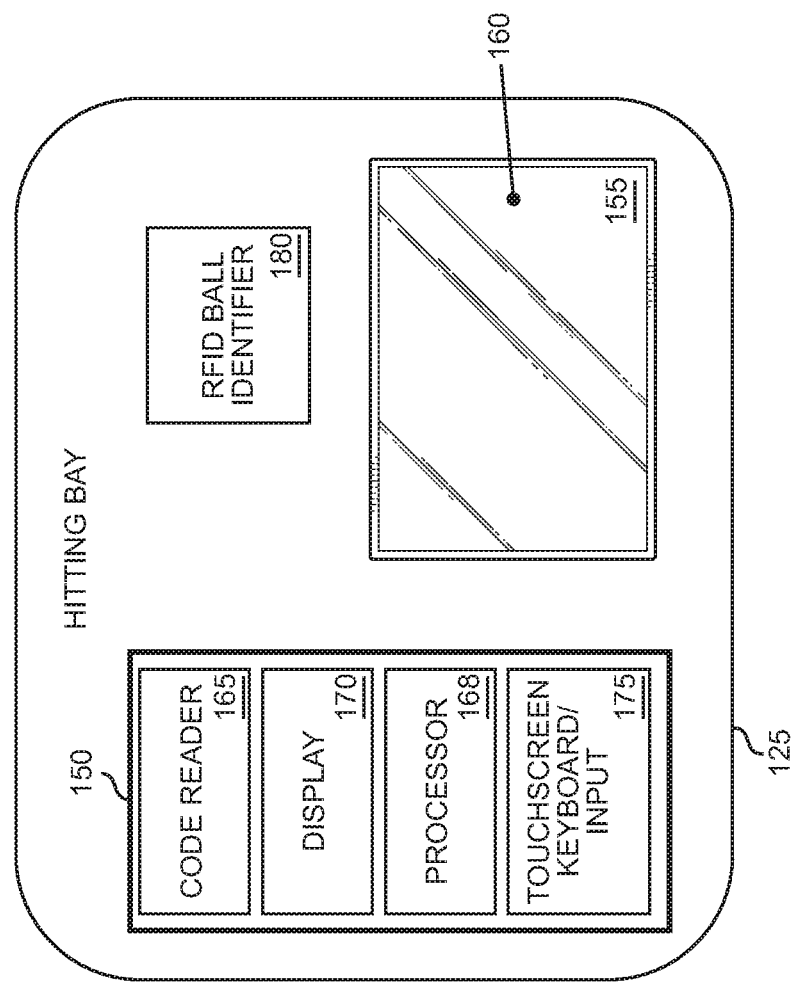
FIG. 2 is a block diagram of a hitting bay for the high integrity golf wagering system of FIG. 1.

Each hitting bay 125 includes a separate PIU 150 is shown in more detail in FIG. 2. Each PIU has a matt 155 with a tee 160 for hitting golf balls one at a time and a magnetic stripe card reader 165 or equivalent, such as a personal electronic device interface (bar code reader, smart-card reader, NFC reader, Bluetooth, etc.), for a player to use to access the player account in hitting bay 125 As previously described, PIU 150 has a processor 168 and display 170 that are included and are in communication with central computer system 140. PIU further includes a keyboard and/or touch-screen 175 or other equivalent device to interact with the user. Hitting bay 125 also includes a mechanism for identifying and/or tracking ball hits from tee 160 on mat 155, such as an RFID identifier 180.

Figure 3F:
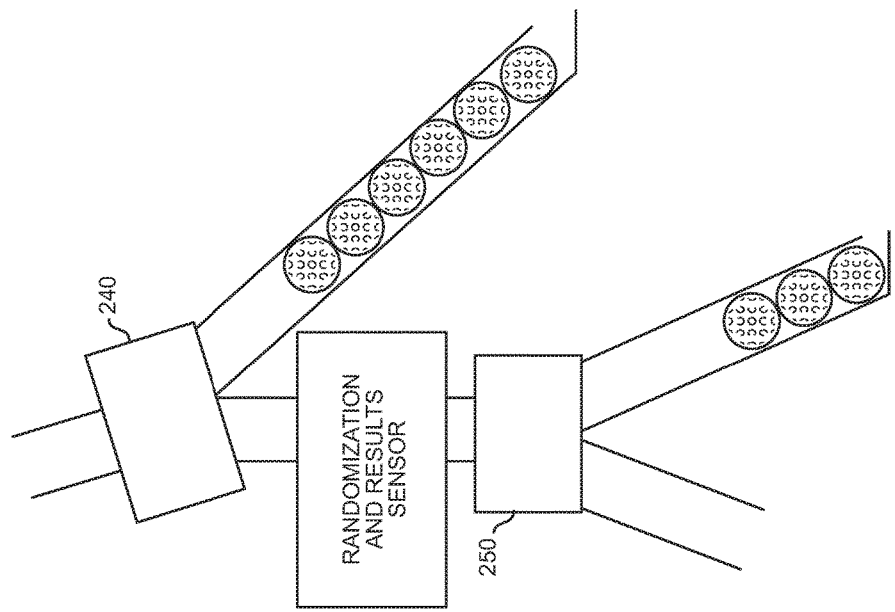
Figure 3E:
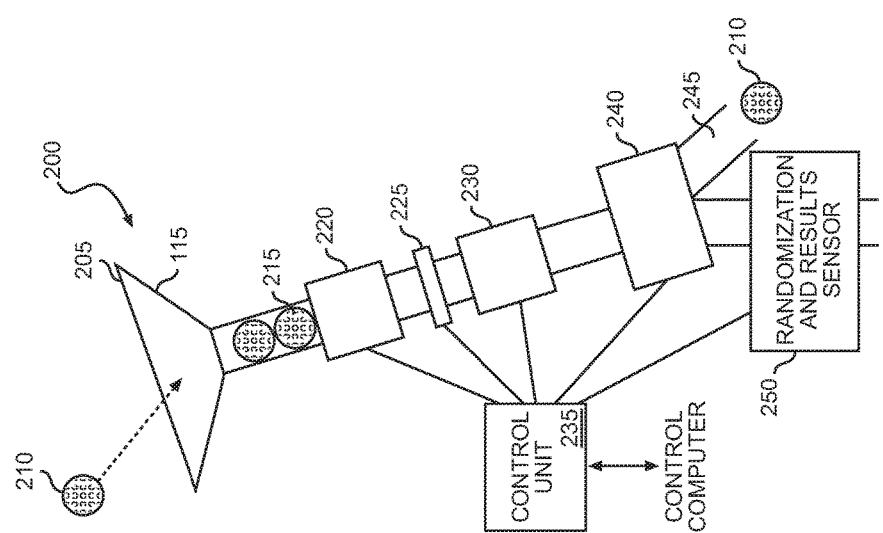

Targets 115, examples of which are shown in FIGS. 3A-3C and a detailed view of internal components of which are shown in FIG. 3D-3F may be of many types, including for example: (a) Flat areas with one or more delineated target areas; (b) Slanted faces with ball-collection areas; (c) Inclined depressions where balls may be collected and or identified as they fall into a receptacle or tube; (d) Tiered target, as noted further in this document (see FIGS. 3A-3C); or (e) Electronically controlled displays with ball accepting receptacles or areas.

Ball tracking is a three step process. The first step is to monitor the impact of the ball at tee 160 and the initial trajectory of the ball as it is struck and leaves hitting bay 125. The second step is to monitoring the flight path of the ball. This is important in some systems to measure "hook" and "slice" to accurately gauge where a ball will land. And, the third step is monitoring impact at the end of the shot when it lands, including in what scoring or target area 115 a ball actually lands.

Different systems may use some or all of these ball tracking elements to achieve a required degree of accuracy in identifying the balls hit, what player hit them and where they landed.

Elements which may be used as part of a golf wagering system are identified as follows:

1. Positive ID Mechanism

In one embodiment of the invention where regulations specify that no skill is permitted to impact the result when a wager is placed and/or to guarantee that a mis-read ball ID at a target does not penalize a player financially, a positive ID requires that: (a) a charge for a player to pay for a wager only occurs AFTER the ball been hit; (b) the ball has entered a target area; and (c) the ball has been identified and linked to a ball that has been previously associated with a particular player. That means that a player will never have the situation where a golf ball is hit and paid for and a corresponding target hit is not properly associated with the play. It has additional value in that it removes an element of skill in the game play. Whether a golfer is a beginner or professional, the only pays are for balls that enter the target.

In this play mechanism, a target hit is followed by a randomized process which can determine various prize levels. The randomization process can be of an electronic or mechanical nature.

If the randomization event is purely electronic, then a computer will generate a game and an associated animation for presentation on one or more electronic displays, including at Player Interface Unit 150. The form of the electronic animation can be of any variety. It may be an electronic representation of a slot machine, or a horse race, a wheel spin, a simulation of any wagering game, or any other imagined way of presenting the prize. One or more randomization events will occur in the system and, based upon a wager amount, a resulting prize level will be determined and an animation will be presented to the player at the Player Interface Unit 150. The game content, or portions of it, may also be presented on other computer displays throughout the facility. For instance, if the game played involves a large bonus prize, it may be of interest to other players that a ball hit by someone in the hitting bays has won the prize, and that information can be presented to multiple players on a centrally located display and/or on displays in the other hitting bays 125 where other people are located and can view them.

In some cases the game may have multiple steps, requiring multiple ball hits successfully landing in one or more targets. In one example of the latter case, the game might involve the generation of a numeric value, and several play events result in the sum of numeric values and a final prize value may be dependent on the sum of those numbers.

In some implementations, a progressive prize can be set up so that very large prizes can be established as a function of play by multiple players either in the same or multiple facilities. A progressive prize is one that grows in real-time. It may grow as a function of game play, game winnings, time or one or more other formulas. In that way, a very large prize value can be offered, which will grow in time and cause increasing levels of player excitement and increased play. A multi-site progressive controller 185 is shown incorporated into golf wagering system 100 over a wide area network 190. Multi-site progressive controller 185 works in a manner similar to wide area progressive systems currently in widespread use for gaming machines in Nevada and other jurisdictions throughout the United States and around the world. In one implementation, a worldwide golf progressive jackpot is enabled, in which progressive controller 185 on a multi-jurisdictional system is enabled to handle play and prizes at multiple sites and/or in multiple currencies.

Figure 4:
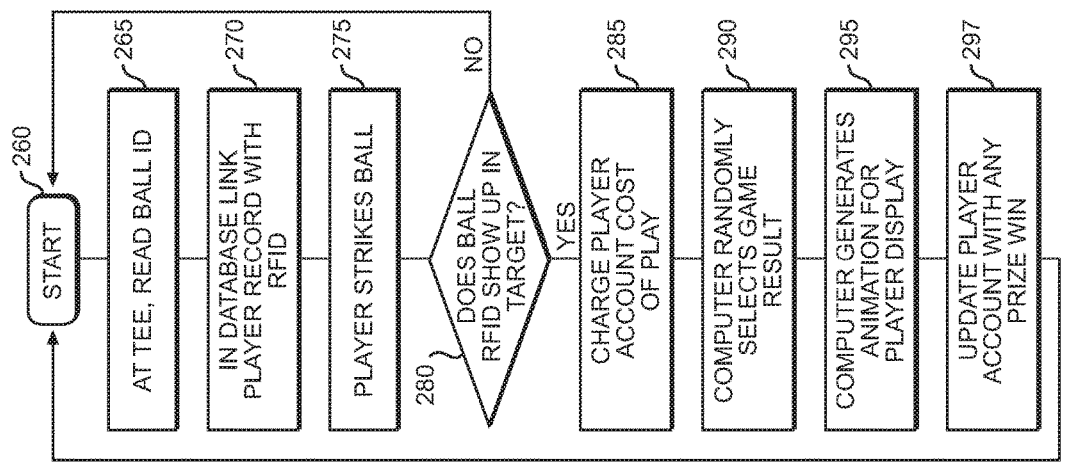
FIG. 4 is a flow chart of the play process for a high integrity golf wagering system.

In another implementation it may be desirable to have a game where the random process is a mechanical process rather than an electronic process. In that case it may be desirable or required to ensure that only one ball can be routed through the mechanical evaluation process at a time. An example of such a process would be analogous in principle to a "pachinko" machine, in which a golf ball enters a target and falls into a space that allows 2-dimensional movement where the motion of the golf ball is affected by a series of obstacles such as barriers or posts that result in eventually dropping the ball into one of N areas, each associated with a particular prize value as shown in FIG. 3G. Optical, or equivalent detection mechanisms 310, are associated with each prize area so that the computer system can be informed of the prize value, and communicated so that it can be displayed on the Player Interface 150 and/or other displays in the golf gaming facility. An example of a simple mechanical process flow with the necessary components is illustrated in FIG. 4.

This mechanical randomization system 200 is shown in FIG. 3E and requires a target entry area 205 where a golf ball 210 hit from mat 155 in hitting bay 125 enters target 115. A ball queue or chute area 215 funnels balls 210 down from entry area 205. As balls are funneled into ball queue area at the base of target entry area 205, ball queue area is formed of a narrow tube with a diameter wide enough to accommodate a single ball to pass through causing the balls to "queue up" behind a ball separation device 220. Ball separation device 220 only allows one ball at a time to pass and is controlled by a control unit 235, which in turn is connected to computer system 140 and PIU 150. As balls make their way through ball separation device 220, each is presented in turn to an optical or other type of ball detector 225 and an RFID or other electronic ID reader 230. Ball separation device 220, optical ball detector 225 and target RFID reader 230 are all connected to target control unit 235. Computer system 140 collects data from ball separation device 220, optical ball detector 225 and target RFID reader 230. This data is compared to information stored in database 135 relating to the player and the ball recorded at hitting bay 150 to verify the particular ball and the player information input at hitting bay 150. Once a ball passes through target RFID reader 230, it moves to diverter 240 that is also controlled by control unit 235, where it is either rejected in rejection chute 245 as being an unverifiable ball, or into mechanical randomization and result sensor 250.

FIG. 3E is an example of one embodiment of target 115. It should be understood that there may be multiple target mechanisms available on the target golf range, corresponding to different prize and play levels. Wagering targets may be intermingled with non-wagering targets or a single target may be used for both. Randomization system 115 contains one or more RFID detectors 230 which identify balls and transmit that data to computer system 140 as described with respect to FIGS. 1 and 3E. In some implementations, ball separation device 220, which allows only one ball at a time to fall through may be required, especially if the randomization technique utilizes a mechanical process as described with respect to FIG. 3E. If a ball enters randomization system 200 and cannot be identified through its RFID (or other mechanism) and associated with an active player, then the ball may be rejected and diverted to rejection chute 245 so that there is no payment or scoring. A collection area at the end of rejection chute 245 may be provided to catch diverted balls for later examination.

If a ball enters randomization system 200 and is identified and associated with an active player, any new balls falling into the entry mechanism are queued up when multiple balls in-process might introduce ambiguity, especially with a mechanical randomization process as described with respect to FIG. 3E. A ball 210 identified in randomization system 200, and associated with a ball linked to a player triggers a payment event which will charge a fee to the player. Prizes that result from the randomization process are registered by computer system 140 and may integrate into games that the player is registered for and displayed on video monitors 170 in hitting bay 125 and other display devices that may positioned throughout the venue where golf system 100 is housed. It may also be desirable to provide a special capture area for balls that have generated prizes that are large or meet other criteria. This may be a security or regulatory requirement. In that case, computer system 140 may activate diverter 250 to direct the ball into a capture area. This will enable verification of the validity of large prize events.

In operation, the system generally follows the steps set forth in the flowchart of FIG. 4. The player starts at "start" 260. A player sets ball 210 on tee 160 at step 265 and an identification device such as an RFID identifier 180 reads the code from the ball to associate that ball with the particular player. The ball is then linked to the player record with the particular RFID code in database 135 at step 270. The player strikes the ball on tee 160 from mat 155 while in hitting bay 125 at step 275 putting it into play. A decision point is then reached at step 280. If the ball lands in driving range 105, but not in a target, the process returns to start step 260. In that case, the ball is collected from the range, reset and made available for replay. If it lands in a target 115, the process moves on to step 285 where the player's account is charged for the cost of hitting the target in the form of a wager on the randomization game. The ball is routed through electronic randomization system with a random game result being selected at step 290. A game animation is shown on display 170 for the player to view and enjoy (see an example of a Martian-themed game in FIG. 8) at step 295 and the system is updated with play information necessary for audit controls, and the player account is updated to reflect play data and any winning prize amount if the play is a winner at step 300.

As an alternative to an electronic system for selecting a random result, a mechanical board or other mechanism may be used with the golf ball to reach a random prize. Such a mechanism is shown in FIG. 3G where a pachinko-style slanted board with obstacles 305 is shown. It will be obvious to those with experience with gaming systems that there may be many forms that this process can take. Any mechanical process can be initiated that has a variety of outcomes that can be mapped into a prize structure. It may or may not involve movement of the ball. In the "pachinko" example, the ball finds a random path through the board to a prize level at the bottom. A set of optical sensors 310, one positioned in each prize station, detects a ball and communicates the "hit" back to computer 140 so that the prize can be calculated and the player can be informed of the winning amount. A camera focused on board 305 may be used to display the event to the player on display 170 and to record the event for audit purposes.

Another embodiment of the invention combines a skill element with a game of chance in a gambling game. The skill element may be used to increase or modify the probability of winning prizes in the game of chance. One example is a game in which golf balls are aimed at a group of targets (e.g. concentric rings as in FIG. 3A). Upon successfully hitting a target, a computerized game is initiated which has various prize levels. More difficult targets may offer a higher probability of winning the jackpot, a higher prize value, a higher overall prize return percentage to players and/or different wager amounts for play.

As an illustrative example, consider the tiered target of FIGS. 3A and 3B. In one embodiment, successfully hitting target elements initiates computerized play of a slot game to be displayed to the player. In this example the game is modified so that a different prize structure is available to the player, depending on which target area is hit. For example, the prize structure may be as follows:

Target 1—Top prize $10,000; percentage return to player is 98%
Target 2—Top prize $5,000; percentage return to player is 95%
Target 3—Top prize $2,000; percentage return to player is 90%
Target 4—Top prize $1,000; percentage return to player is 85%
Target 5—Top prize $500; percentage return to player is 80%.

In another example, the probability of hitting a prize, including a progressive prize, can be increased. This can be presented in many visual ways to the player in the presentation of the computerized slot game. By way of example, the slot game might consist of a multi-reel game where the jackpot is hit by lining up 5 jackpot symbols. The increased probability can be presented by starting the game play by having some of the 5 reels pre-set with a jackpot symbol and only spinning the rest of the reels. If the game were a 5 reel game, 2 reels could be set to display the jackpot symbol and only the other 3 would have a simulated spin.

In a positive ID based implementation, hits on different target tiers could also initiate a different wager amount, giving yet more flexibility to the game designer. In one example of such a case, the hardest prize to hit might also have a very high jackpot, but a high wager cost as well.

Yet another embodiment of the invention combines a skill element with a game of chance in a gambling game for a particular player. In this embodiment, the game tracks play of the particular player and adjusts future prize structures or payout percentages based on past play over time. The particular player is identified through facial recognition, a player ID card or other means. For example, adjustments can be on a per day, per play or other measure based on changing play capabilities over time. This information can also be used to categorize players under a skill level matrix, combined with other player attributes or identifiers, so that they might be eligible for awards, promotions, prizes or other incentives.

2. Video Tracking

Improvements in the capability of video cameras in terms of resolution and picture quality, as well as improvements of the state-of-the-art in software analysis of video images makes possible a comprehensive system for tracking a ball from tee to target by integrating multiple video images, or, alternatively, combining those images with other detectable measurements or events.

Figure 5A:
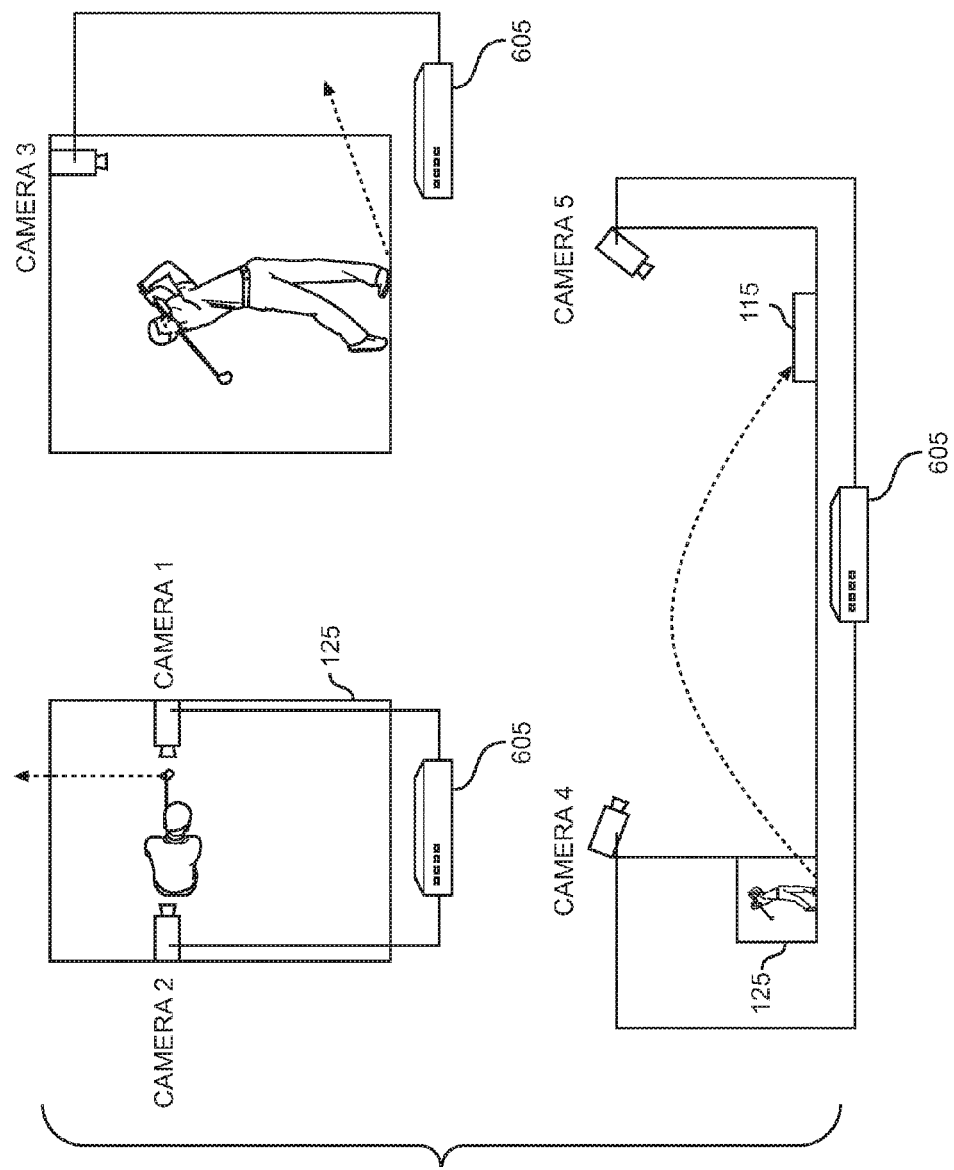
FIGS. 5A-B show hitting bay configurations for the high integrity golf wagering system of FIG. 1 with optical and infra-red cameras.

One approach, which is an object of this invention, is to use cameras to capture the 3 stages of a golf ball's path from hitting bay 125 to target 115, as shown in FIG. 5. In hitting bay 125 (which includes the area around tee 160 and mat 155, where the ball is placed before hitting), multiple cameras can be placed so as to provide a clear video image of ball 210, even if some camera angles are blocked. For instance, a camera viewing the ball from in front of a right-handed golfer would be blocked if the golfer were a left-handed golfer and put his body between the golf ball and camera. FIG. 5A presents an option for placing at least 3 cameras in hitting bay 125. Cameras 1 and 2 will be able to record images of the ball being struck and leaving the bay. Control software running on computer 140 and controlling the cameras over local area network 145 analyze the images and record, minimally, the time that the ball is struck, the speed of the ball leaving the bay, and the angle of horizontal inclination. Camera 3, overhead, will be able to record the left-to-right angle of the hit. It may also be able to make a determination of any left or right turning of the trajectory ("hook" or "slice") that results from ball spin.

After the ball has left hitting bay 125, one or more overhead cameras positioned above the bays such as Camera 4, will have a second opportunity to capture the path of the ball and, with wider view than the cameras in the bay, specifically to capture any left or right turning in the trajectory ("hook" or "slice"). The control software will be able to record the time of the ball leaving the bay, the speed of the ball and the trajectory. From this information a likely destination target (or targets) can be determined.

Camera 5, representing a multiplicity of different cameras each of which will be associated with a particular target, can specifically record balls entering target area 115 and track ball impact and/or entry into target positions.

Using time and angle measurements from all cameras, control software can integrate the factors and produce an accurate record of each ball hit, its flight trajectory, and what target was hit (if any).

In some implementations it may be very desirable to have analysis of the location of balls on a tee before the ball is hit, and in particular to track a multiplicity of balls, each potentially with a known RFID value and enable positive confirmation of which ball was on the tee at the time the ball is struck.

Figure 5B:
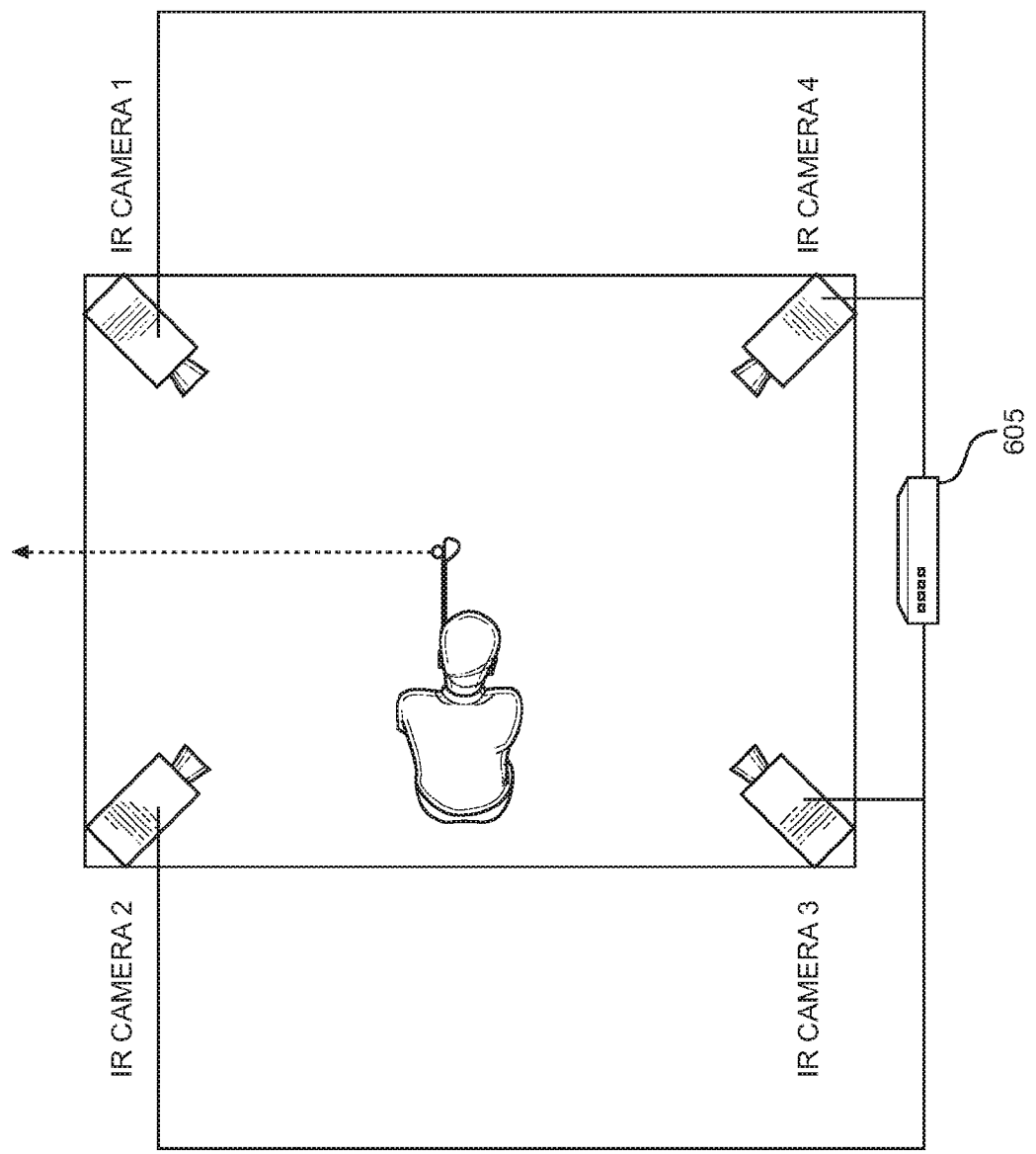

An arrangement is illustrated in FIG. 5B which will enable this determination. A multiplicity of infrared cameras is mounted so that they can view the tee area at all times and communicate the images to control computer 605. By identifying the ball images and tracking their angular motion, the exact position of all balls can be readily calculated. In such a configuration it is important to have enough camera coverage that normal obstruction of some camera angles by the player will not prevent proper identification.

In a further refinement, such ball identification by control computer 605 can be linked to a linked to a video and/or audio alert system, that can confirm to the player that the ball on the tee is properly identified and ready for play. One example would be to display a green light at PUI 150 when the ball on the tee is identified and a red light when no ball is properly identified on the tee.

3. Optical Ball Strike Configuration

One method of increasing the reliability of entertainment golf games is to have improved confirmation of the ball being struck and to track its flight to a target. It is possible to confirm the identification of a golf ball by reading an RFID imbedded in the golf ball before the player hits the ball. The precision of the game can be improved if the system can also confirm the time that the golf ball has been hit, and further, determine the direction and speed of the ball as well as where it has landed.

Figure 6:
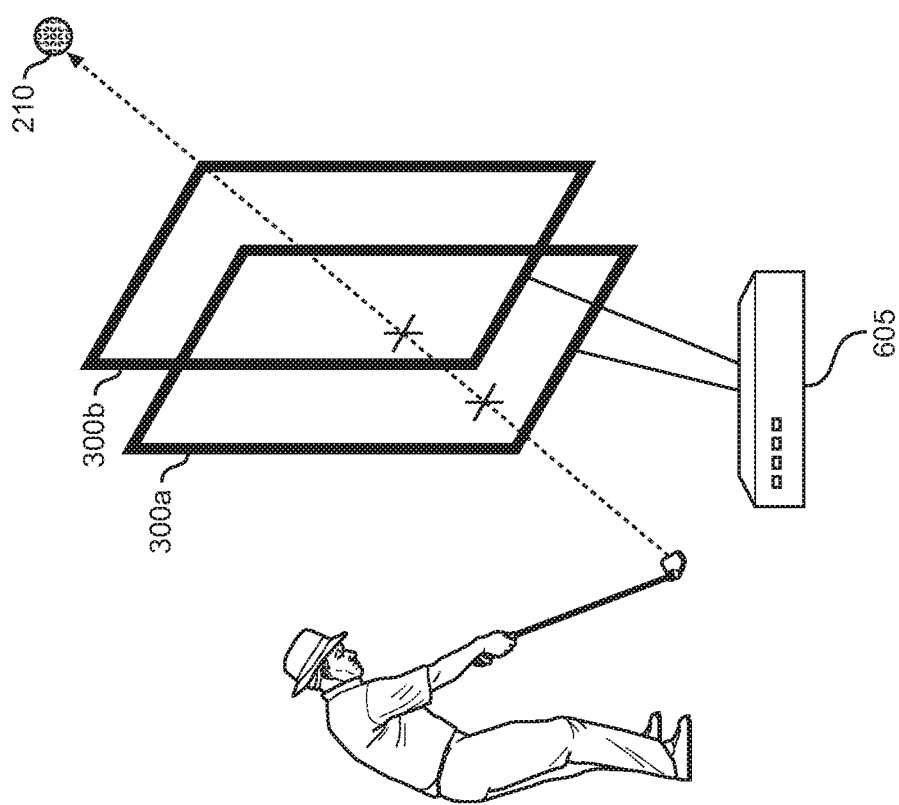
FIG. 6 is a hitting bay with optical sensor frames for detecting and predicting ball flight trajectory.

A novel way of accomplishing this is to position two optical sensor frames 300*a-b* in front of the area where the golf ball is to be struck as illustrated in FIG. 6. Each of the sensor frames has an array of LED emitters and sensors that can detect the presence of an object passing within the frame. Such frames may be similar to devices such as the ShadowSense 81 manufactured by Baanto International Ltd. of Missisuaga, Ontario. By utilizing two such frames, knowing the time and X-Y coordinate as the ball passes through each frame, a calculation of speed and direction of the ball can be made, as well as the angle of the trajectory in an upward, downward and/or sideways direction.

Knowing the time the ball is hit, as well as its speed and position as it passes through each of the two sensor frames, along with the other attributes, it is possible to correlate a potential arrival time on a target with an actual target hit, even if the ball that hit the target does not have its RFID read correctly.

4. Random Prize on No Hits

One technique to enhance the interest of randomized prize golf games where payment is made on striking a golf ball (without requiring a target hit) is to award certain prizes even when targets are missed. An algorithm can be applied that heuristically measures the incidence of target hits to misses and can introduce random small prize games when the ratio is very low. This can be done to bring the payback up to a minimum threshold level. This will keep less skilled golfers from becoming discouraged and will encourage more players to participate.

5. HELP Button

In some implementations, it may be important to have a HELP function clearly defined on the player user interface 150 to identify any adverse play situations that may be encountered, especially if there is a suspicion by the player that a target may have been hit properly and not recorded properly in the system. An indication from a player by selecting a HELP function that they thought a ball entered a high-value target but was not registered, can trigger an audit that can require physical examination of the target ball receptor. That information, combined with the video records and timing data recorded on the flight of each ball hit from the hitting bay will enable correction of any error in most instances.

6. Tiered Target

Many types of target design are usable in conjunction with a golf wagering system 100. A Tiered Target is shown in FIGS. 7A-7D, which has different target areas at different heights, including the possibility of one at ground level. Each target area will have different scoring (or game) possibilities and will have appropriate ball detection and identification mechanisms Target 115 provides a positive experience for players because it allows low tiers into which balls may easily roll or bounce. This is good for less-skilled players who might not be able to hit the ball well consistently and would be frustrated by efforts to hit the ball into a higher, smaller target. Target 115 is also highly visible, making it attractive to players because it will be easily visible from a hitting bay. Target 115 may have many different lighting options for evening visibility and entertainment. Different areas of target 115 may be color-coded and/or lighted to indicate scoring differences. The different tiers may also include mechanical or digital signage to indicate different scoring values be associated with different tiers, and many different scoring tiers can be configured in a limited amount of space.

When implemented with a system which uses RFID as a component or the sole means of ball identification, each target area as shown in FIG. 3D, has a slanted bottom area which gravity-feeds a golf ball to a receptor area which includes an RFID reader or sensor and may include a ball separation device 220 and a ball-detector 225, as shown in FIG. 3E. These may be separate elements, or some of the functions may be combined into units which perform more than one of the functions.

An example of a tiered target is shown in FIGS. 3A-B. In that example the target is formed into concentric rings, each of which is can be a different target area. In a further version of this example the individual rings may be sectioned into parts, each one of which may have a separate scoring value;

Another example of a tiered target is illustrated in FIGS. 3A-C. This variant is similar to a staircase, with target openings on each step. It is attractive because it uses space efficiently and is conducive to different kind of signage and lighting. The horizontal areas may be further subdivided into multiple target areas.

One illumination option for tiered target configurations is projection lighting, either using conventional light projection of any type or laser projection. FIG. 3C illustrates a tiered target with a projection unit protected from ball strikes by a housing.

7. Game Examples

Following are examples of a few games which are possible with the described systems. It should be noted that many more games can be constructed and other games can be formed by combining elements of these described games.

7.1 Group Game

Figure 7B:
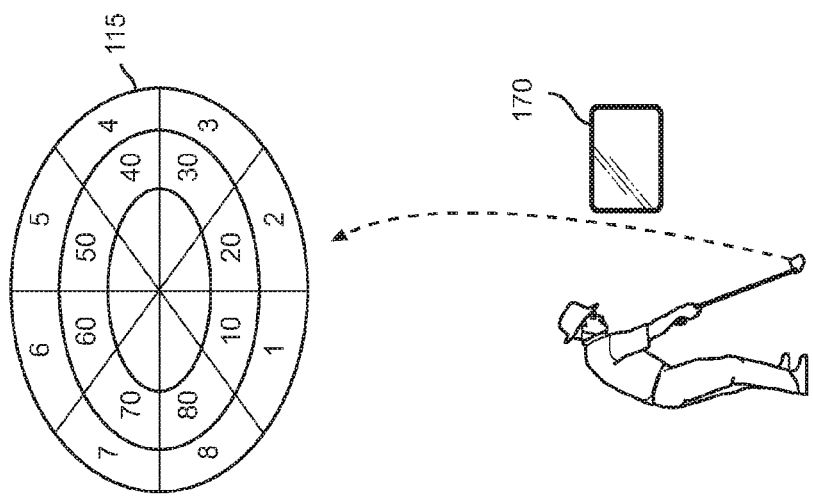
Figure 7A:
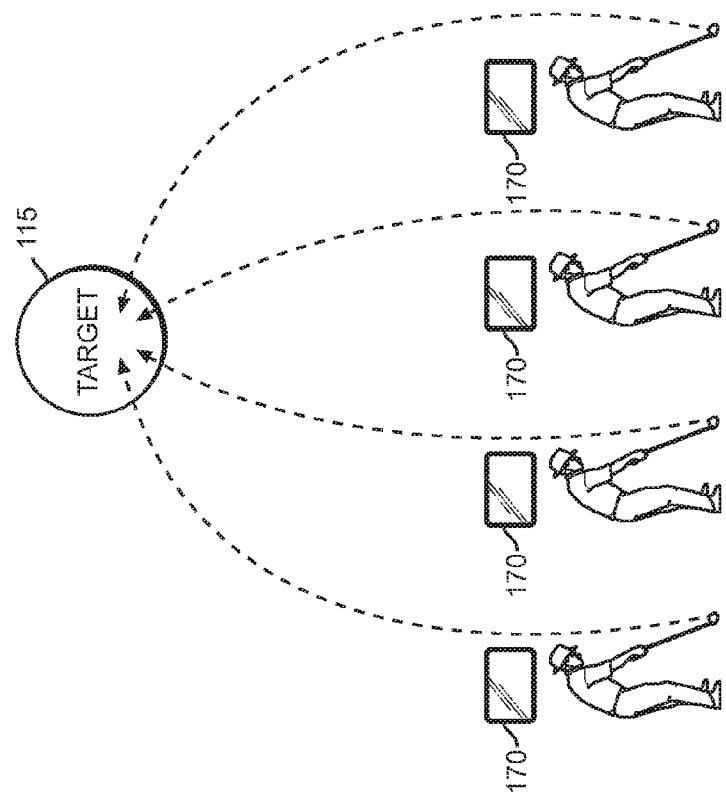
Figure 10:
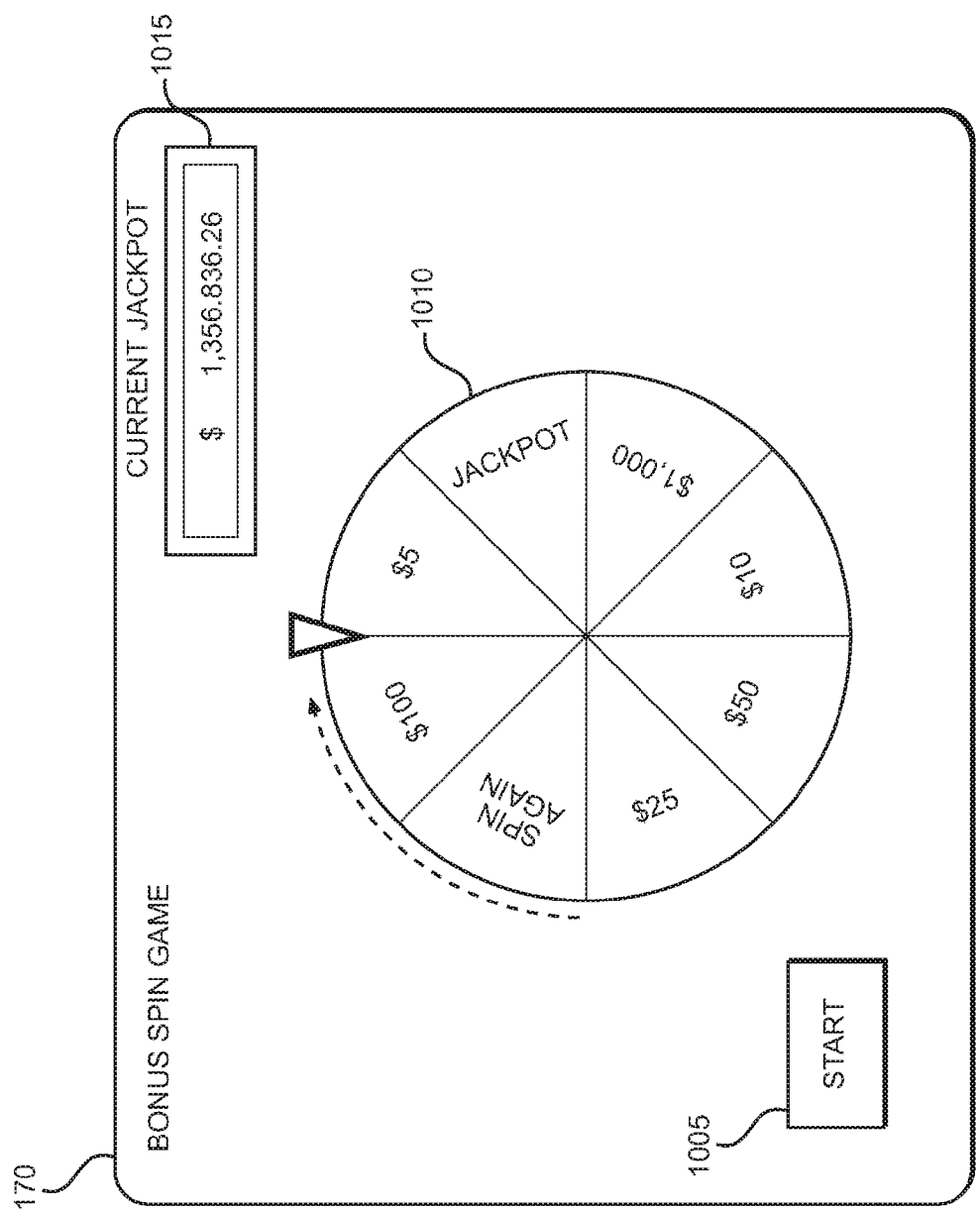
FIG. 10 is a bonus spin game that may be implemented on a high integrity golf wagering system.

One example of a group game may be played using a target configuration like that shown in FIG. 7A. The play process includes a number of steps. First, a group of N players enroll in a game play round for a fee. Each game has a fixed number of balls with each player assigned to hit m balls. Once all balls have been hit, a score and/or randomized prize are determined on central computer 140 for each ball landing in a target 115. Throughout play, players can check progress on displays 150. Actual game play steps may include, in addition to hitting balls, a wheel spin or other game for a progressive jackpot prize. FIG. 10 shows an example of what the player may see displayed for a progressive bonus spin game. Upon completion of the game, the player with the most prizes in a round also gets a percentage of the buy-in of the N players.

7.2 N-Balls-In-Order Game

Another type of game play is a game where a player attempts to hit targets in a particular order. This game type is shown in FIG. 7B. A player hits balls and attempts to hit targets in a numerical order, e.g. 1 . . . 2 . . . 3 . . . 4 . . . . The prize value is determined from the number of targets hit and those hit in the correct order. For example, hitting 1 to 3 in order gets prize value A, hitting 1 to 5 gets a bigger prize, value B. Play status is always indicated to the player on one or more video screens. When a predetermined maximum number of consecutive numbers are hit the prize may include a wheel-spin or other game representation which provides a randomized chance to win a progressive prize.

7.3 World-Game

Another type of game incorporating the invention is a world-game which is shown in FIG. 7C. Among prizes available is a hole-in-one prize. Upon hitting a hole-in-one, the player may be awarded a wheel-spin or other game representation which provides a randomized chance to win a wide-area progressive game, or another, very large prize. A percentage of all World Game revenue will be allocated to growing the prize in real-time, which will be displayed to all participating venues, regardless of where they are located in the world. Displays and currency conversion will be handled by the wide-area progressive controller 185. A leader board is shown on display 170 indicating large prizes won in the game with the location of win and an optional player identifier. Display 170 may be located at the hitting location and/or on large commonly viewable displays throughout a facility.

It should be understood that the prize matrix is constantly changing in real-time so the player does not know where prize values will be when they strike the ball. Prizes will be awarded by strings of consecutive hits. Values of consecutive hits will be added to qualify for prizes. The largest values will result in awards of tiers of progressive jackpot prizes.

7.4 Matrix Game

Another type of game embodying the invention is a matrix game which is shown in FIG. 7D. In this game, players hit balls at a matrix of targets 705. Each target within the matrix has a prize value displayed which is controlled by a computerized controller within or linked to the site control computer 605. Under control of the controller 605 and/or the site control computer 140, the prize matrix 705 constantly changes in real-time so the player does not know where prize values will be when they strike the ball. When the prize matrix changes, the prize values on a target will change, and target areas may be enabled and disabled. SPIN indicates a wheel-spin game or other randomized prize award mechanism which provides an opportunity at a large progressive or non-progressive prize as shown in FIG. 10. Other prize values may be fixed award amounts (e.g. $10) or a play of another computer controlled game representation with a variable award. One example of a way to devise a target to support this type of game is illustrated in FIG. 3C, which is a tiered target 305 with multiple target areas, each area having a display area above the target openings. Each tier is further divided into several horizontal target areas 310 with images above each target. The projection system is controlled by system computer 140 and is constantly altering the prize value in each target segment and reflecting that change in the projected value. The "X" in the horizontal target areas 310 indicates that that a specific target area is not active for a prize. By controlling the value and frequency of the target values a player return percentage can be accurately projected.

7.5 Slot Game

One form of a game randomization will be represented as a slot machine. It may be initiated when a player hits a target identified with a particular game theme, or may be one of a set of random games that may be selected by the system or by the player This game will randomize a game result and derive a payback prize that is a multiple of the wager amount that is specified for the game, and may have been pre-selected by the player. The player may be prompted with questions on display 170 to decide whether to participate in a wagering game and to set the wager(s) level at which they wish to participate. This is especially important if the game is of the positive ID type. A screenshot of such prompting is shown in FIG. 9.

A paytable like the one below specifies possible prizes, and based on a random selection using the probability of each type of prize as a weight, a prize amount will be chosen which will be the Prize Value multiplied by the wager amount.

| Prize Value | Frequency | Probability | Return |
| --- | --- | --- | --- |
| 1,000.00 | 100 | 0.0001000 | 100,000.00 |
| 500.00 | 1000 | 0.0010000 | 500,000.00 |
| 250.00 | 100 | 0.0001000 | 25,000.00 |
| 125.00 | 57 | 0.0000570 | 7,125.00 |
| 75.00 | 999 | 0.0009990 | 74,925.00 |
| 50.00 | 400 | 0.0004000 | 20,000.00 |
| 25.00 | 200 | 0.0002000 | 5,000.00 |
| 15.00 | 1000 | 0.0010000 | 15,000.00 |
| 10.00 | 1000 | 0.0010000 | 10,000.00 |
| 5.00 | 10000 | 0.0100000 | 50,000.00 |
| 2.00 | 2000 | 0.0020000 | 4,000.00 |
| 1.00 | 103750 | 0.1037500 | 103,750.00 |
| 0.50 | 10000 | 0.0100000 | 5,000.00 |

| 0.20 | 1000 | 0.0010000 | 200.00 |
| 0.00 | 868394 | 0.8683940 | 0.00 |
| | 1000000 | 1.0000000 | 920,000.00 |

SUMMARY

| Sample Size | 1,000,000 |
|---|---|
| Return to player | 920,000.00 |
| % Return to Player | 92.00% |
| Number of Prizes | 131606 |
| Prize Frequency | 13.16% |

Figure 8:
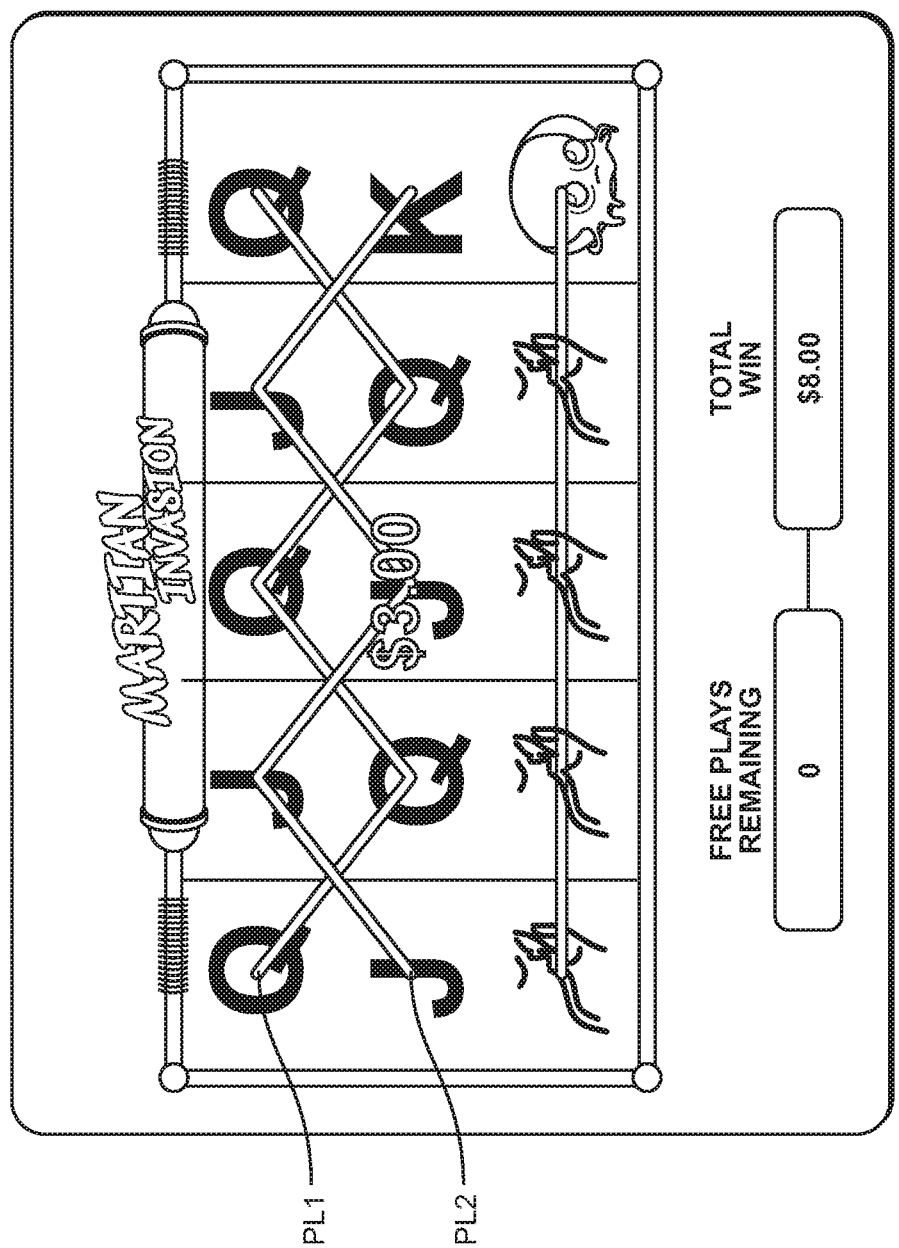
FIG. 8 shows a slot machine type game play screen that may be implemented on a high integrity golf wagering system.

An entertaining display will then be presented on display 170 of PUI 150 in hitting bay 125. Display 170 will show a slot-themed game, with entertaining sounds and bonus features such as are well known to those familiar with the art of casino game design. Symbols change on the screen, simulating spinning reels, and stop in a pattern that displays prize values for combinations of symbols in certain lines or other configurations, or, alternatively, in various quantities. An example of such game play is shown in FIG. 8 with a space-themed "Martian-Invasion" game having two winning combinations of symbols: (1) Q-Q-Q-Q-K on payline PL1; and (2) J-J-J-J-K on payline PL2.

While the invention has been described with respect to the FIGS. 1-10, it will be appreciated that many modifications and changes may be made by those skilled in the art without departing from the spirit of the invention. For example, different mechanical type random selector mechanisms can be used as alternatives to the one shown in FIG. 3G. Any variation and derivation from the above description and drawings are included in the scope of the present invention as defined by the claims.

The invention claimed is:

1. A high integrity golf wagering system, comprising:
   at least one golf ball with an electronic identification component;
   a range with at least one bay from which a player hits the at least one golf ball;
   a bay ball reader for detecting and recording ball identification information associating the ball with a player;
   at least one target placed a distance from the bay and into which the player attempts to hit a ball, each target further comprising:
   a target entry for receiving a ball;
   a target ball reader for detecting and recording ball identification information;
   a game randomizer;
   a target control unit connected to the target ball reader and game randomizer that receives ball identification information from the target ball reader and controls game randomizer functions; and
   a computer connected to the bay ball reader and the target control unit for receiving ball identification information from the bay ball reader and the target ball reader, tracking the at least one golf ball associated with a player and tracking wagers and awards for winning plays.

2. The high integrity golf wagering system of claim 1 further comprising a network for connecting the computer to the bay ball reader and the target control unit.

3. The high integrity golf wagering system of claim 1 further comprising a progressive system connected to the computer and at least one other computer of another high integrity golf wagering system, and configured to provide progressive prize awards to players playing games on any high integrity golf wagering system connected to the progressive system.

4. The high integrity golf wagering system of claim 1 further comprising at least one point of sale station connected to the computer for receiving information related to funding a player account and redemption of prizes.

5. The high integrity golf wagering system of claim 1 further comprising at least one management terminal connected to the computer for managing game configuration, controlling system operation and providing financial and other data reports related to system operation.

6. The high integrity golf wagering system of claim 1 further comprising at least player interface unit in the hitting bay at which the player interfaces with the computer, including to place wagers on play.

7. The high integrity golf wagering system of claim 1 further comprising a randomizer connected to the computer that provides a random chance opportunity to win a prize for a ball detected in a target.

8. The high integrity golf wagering system of claim 1 further comprising at least one display at the hitting bay and connected to the computer for displaying game results and other information to a player.

9. The high integrity golf wagering system of claim 1 further comprising a player identification reader for identifying a player and authorizing access to a player account.

10. The high integrity golf wagering system of claim 1, further comprising at least ball monitoring device for capturing, recording and tracking activity of a golf ball from the group comprising: (a) a camera; (b) a sensor frame; (c) infrared detectors; (d) radar detectors; and/or (e) optical detectors.

11. The high integrity golf wagering system of claim 1 further comprising software running on the computer for performing game functions to provide a game of chance for a ball detected in a target.

12. The high integrity golf wagering system of claim 1 further comprising software running on the computer for performing game functions based on a game of skill for a ball detected in a target.

13. The high integrity golf wagering system of claim 1 further comprising software running on the computer for performing game functions to provide a game of chance with a skill element for a ball detected in a target.

14. A method of playing a game on a high integrity golf wagering system, comprising:
   detecting ball identification information from a ball using a sensor in a hitting bay where one or more players are positioned;
   recording the ball identification information and storing the ball identification information in a tracking database accessible by a controller receiving the ball identification information from the sensor;
   associating the ball with a particular player in the database;
   providing at least one target placed a distance from the hitting bay and into which one or more players attempts to hit a ball;
   receiving balls at the at least one target hit by the one or more players;
   detecting balls hit into the target using a target sensor;
   receiving ball identification information for detected balls at the controller from the target sensor;
   randomizing the result of game play based on the ball identification information for play by the one or more players; and using the controller to track the at least one golf ball associated with the players; and tracking wagers and awards provided for winning plays.

15. The method of claim 14 wherein the high integrity golf wagering system further comprises a network for connecting the controller to the sensor and the sensor.

16. The method of claim 14 wherein the high integrity golf wagering system further comprises a progressive system connected to the controller and at least one other controller of another high integrity golf wagering system, and configured to provide progressive prize awards to players playing games on any high integrity golf wagering system connected to the progressive system.

17. The method of claim 14 wherein the high integrity golf wagering system further comprises at least one point of sale station connected to the computer for receiving information related to funding a player account and redemption of prizes.

18. The system of claim 14 wherein the high integrity golf wagering system further comprises at least one management terminal connected to the controller for managing game configuration, controlling system operation and providing financial and other data reports related to system operation.

19. The system of claim 14 wherein the high integrity golf wagering system further comprises at least player interface unit in the hitting bay at which the player interfaces with the controller, including to place wagers on play.

20. The method of claim 14 wherein the high integrity golf wagering system further comprises a randomizer connected to the controller that provides a random chance opportunity to win a prize for a ball detected in a target.

21. The method of claim 14 wherein the high integrity golf wagering system further comprises at least one display at the hitting bay and connected to the controller for displaying game results and other information to a player.

22. The method of claim 14 wherein the high integrity golf wagering system further comprises a player identification reader for identifying a player and authorizing access to a player account.

23. The method of claim 14, wherein the high integrity golf wagering system further comprises at least ball monitoring device for capturing, recording and tracking activity of a golf ball from the group comprising: (a) a camera; (b) a sensor frame; (c) infrared detectors; (d) radar detectors; and/or (e) optical detectors.

24. The method of claim 14 wherein the high integrity golf wagering system further comprises software running on the controller for performing game functions to provide a game of chance for a ball detected in a target.

25. The method of claim 14 wherein the high integrity golf wagering system further comprises software running on the controller for performing game functions based on a game of skill for a ball detected in a target.

26. The method of claim 14 wherein the high integrity golf wagering system further comprises software running on the controller for performing game functions to provide a game of chance with a skill element for a ball detected in a target.

* * * * *